May 19, 1964 E. A. BARTKUS ETAL 3,134,096

MAGNETIC MEMORY

Filed June 29, 1962

INVENTORS
EDWARD A. BARTKUS
ROBERT F. ELFANT
KURT R. GREBE
NICHOLAS J. MAZZEO

BY [signature]
ATTORNEY 3,134,096

MAGNETIC MEMORY

Edward A. Bartkus, Stamford, Conn., and Robert F. Elfant, Yorktown Heights, Kurt R. Grebe, Beacon, and Nicholas J. Mazzeo, Peekskill, N.Y., assignors to International Business Machines Corporation, New York, N.Y., a corporation of New York Filed June 29, 1962, Ser. No. 206,403
8 Claims. (Cl. 340—174)

This invention relates to an improved magnetic memory structure and more particularly to a magnetic memory structure employing biased tubular magnetic cores for storing binary information.

In a copending application, Serial No. 206,356, filed June 29, 1962, assigned to the assignee of this application, an improved magnetic core memory is described which comprises a plurality of word-column conductors and a like plurality of tubular bistable magnetic cores surrounding a respective one of the column conductors. Each core has, dispersed along its length, a plurality of portions each having a pair of oppositely disposed secondary apertures whose central axes are transverse with respect to the longitudinal axis of the core. A plurality of bit-row conductors are provided each of which is threaded through a respective pair of secondary apertures of each core. Either a plurality of sense conductors may be provided each coupling the cores similar to the row-bit conductors, or switching means are provided to employ the bit-row conductors as a bit sense line during read out, and a drive conductor during the write operations.

It has been found that the signal-to-noise ratio of the proposed memory varies, depending upon the fabrication tolerances. This signal-to-noise ratio for the memory determines the degree of discrimination required for the output sense amplifiers, that is, as this ratio decreases the cost of the peripheral equipment and error rate increases, therefore, dictating the desirability of keeping this ratio as high as possible to lower overall costs. However, in order to keep the signal-to-noise ratio of the memory as high as possible very tight tolerances must be adhered to, thus increasing fabrication costs.

The above paradox is resolved by employing the teachings of this invention, wherein the signal-to-noise ratio is kept at a maximum by employing a bias technique. It has been found that by biasing each tubular core with a magnetic field directed along its longitudinal axis, practically all noise signals are eliminated, therefore relaxing the fabrication tolerances.

Accordingly, it is a prime object of this invention to provide an improved magnetic core memory in which high signal-to-noise ratio of the output signals are obtained.

Another object of this invention is to provide an improved magnetic core memory which utilizes a biased tubular magnetic core for storing information and providing high signal-to-noise ratio of the output signals.

Still another object of this invention is to provide a magnetic core memory employing tubular magnetic cores each of which is magnetically biased along its longitudinal axis for providing large signal-to-noise output signals.

The foregoing and other objects, features and advantages of the invention will be apparent from the following more particular description of preferred embodiments of the invention, as illustrated in the accompanying drawings.

Figure 1:
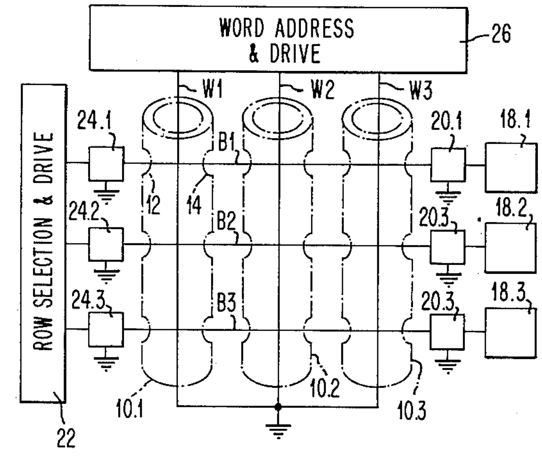
FIG. 1 is a schematic of a magnetic memory.

Referring to FIG. 1, a schematic of a magnetic memory as proposed in the above-cited copending application is shown. The memory is provided with a plurality of word-column conductors W1–W3; a plurality of tubular magnetic cores 10.1–10.3 each surrounding a respective one of the conductors W. Each core 10 has a plurality of portions dispersed along its length each having a pair of oppositely disposed secondary apertures 12 and 14. A plurality of bit-row conductors B1–B3 are provided each of which is threaded through a different pair of secondary apertures 12 and 14 of each core 10. The bit-row conductors B1–B3 have one end connected to utilization means 18.1–18.3 through switching means 20.1–20.3, respectively, while the other end is connected to a selection and drive means 22 through switching means 24.1–24.3, respectively. The switching means 20 and 24 operate to connect the bit-row conductors B to the utilization means 18 during a first time interval in the operation of the memory and, during a second time interval to connect the conductors B to the row selection and drive means 22. The word column conductors W are connected to a word address and drive means 26 which is operative to energize a selected one of the conductors W1–W3, during the first time interval to apply a circumferential magnetic field and establish the core 10.1–10.3 associated therewith in a datum stable state of remanent flux orientation. At this time, the conductors B are connected to utilization means 18 through operation of switches 20 and 24. This operation will hereinafter be referred to as the "read out" portion of the memory cycle or just simply "read out" of the memory. During the second time interval, the word address and drive means 26 is operable to energize the selected column conductor W to apply a circumferential magnetic field to the core 10 associated therewith which is directed to opposite the datum remanent flux orientation but is of insufficient magnitude of and by itself, to cause a total irreversible flux change. The bit selection and drive means 22 is operable during the second time interval to energize at least one of the bit row conductors B and apply a magnetic field to the cores 10.1–10.3 directed clockwise about the threaded secondary apertures 12 and 14. The field applied about apertures 12 and 14 by the energized conductor B is of insufficient magnitude, of and by itself, to cause an appreciable irreversible flux change in the datum remanent flux orientation stable state of the cores 10, but is conjointly operable, in the core 10 associated with the energized W conductor, to irreversibly switch the datum remanent flux orientation stable state, in that portion of the core coupled by the energized row conductor B, to a different remanent flux orientation stable state.

Figure 2:
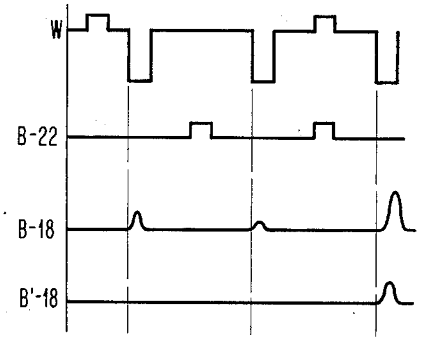
FIG. 2 is a pulse program for the memory of FIG. 1.

Referring now to the FIG. 2, a pulse program for the memory of FIG. 1 is shown wherein the pulses provided by means 26 to a particular word conductor are shown and labelled W, pulses provided by means 22 to a conductor B are labelled B–22, while the output signals obtained on a conductor B when connected to utilization means 18 are labelled B–18. It should be noted that in those bit positions of the selected word wherein a binary 1 is not stored, a positive impulse of given magnitude is induced on the output line during the read out portion of the memory cycle and that in those bit positions which are energized by the row conductor B only, during the read out portion of the memory cycle, a positive impulse is also induced on the output line whose magnitude is much smaller than the given magnitude of the word noise output signal. The output signal provided by a bit position which has stored therein a binary 1 by coincident application of bit and word currents is much larger in magnitude than the given magnitude of the word disturb signal; however, for purposes of distinguishing a binary 1 output signal from a word disturb signal, the utilization means 18 must discriminate against the maximum noise signal obtained. Thus, if the noise signal is say five millivolts while the binary 1 signal is, at a maximum 10 millivolts, the maximum signal-to-noise ratio is 2:1 and the utilization means 18 must discriminate between these two output voltages. The real problem is that with respect to any one bit storage position of a core 10 this signal-to-noise ratio may be fixed and determined, while for the next bit storage position of the same core 10 this ratio may be much smaller, therefore, dictating the necessity of tighter fabrication tolerances.

Figure 3:
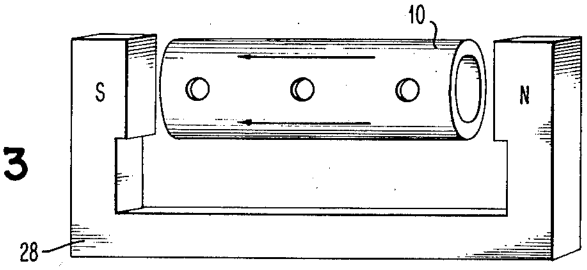
FIG. 3 is an improved structure for the memory of FIG. 1 according to one embodiment of this invention.
Figure 4:
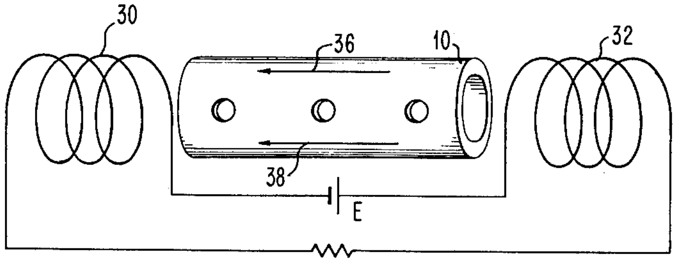
FIG. 4 is another embodiment of this invention.
Figure 5:
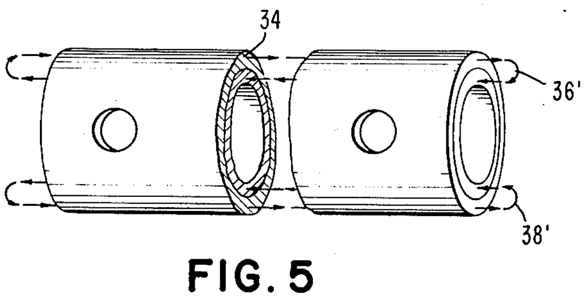
FIG. 5 is still another embodiment of this invention.

Referring now to the FIG. 3, a schematic of the improved memory according to one embodiment of this invention is shown in fragmentary form. That is, one core 10 of the memory of FIG. 1 is shown for ease of presentation. It has been found that by biasing the core 10 with a field directed along its longitudinal axis the signal-to-noise ratio of the memory is increased by orders of magnitude. The biasing field may be provided by use of opposite poles of a permanent magnet 28 labelled N and S, positioned at opposite ends of core 10. Alternate embodiments for providing this longitudinal bias field to the core 10 is shown in FIG. 4, wherein a Helmholtz coil, represented by windings 30 and 32 connected to a battery E, is employed, and in FIG. 5, wherein a high coercive force magnetic material 34 is provided over the original core material magnetized to provide the bias field, as indicated by arrowed lines 36 and 38 and 36′ and 38′, respectively. The high coercive force material may be painted on the material of core 10 by use of a method disclosed in a copending application, Serial No. 206,145, filed June 29, 1962, which is assigned to the assignee of this application.

When information is to be stored during the write portion of the memory cycle, the selected word column conductor is energized to apply a circumferential magnetic field to the core in opposition to the datum remanent flux orientation stable state established during read out. This field is normally of sufficient magnitude of and by itself, to cause total irreversible flux change in the datum remanent orientation stable state but due to the presence of the bias field little or no irreversible flux change takes place in the portion of the cores 10 adjacent apertures 12 and 14. That is, the datum remanent flux orientation of the core adjacent the apertures 12 and 14 undergoes no appreciable irreversible flux change. At least one bit row conductor B is coincidently energized to apply a magnetic field to the portion of the core coupled, which field is directed clockwise about secondary apertures 12 and 14. These fields add on one side of aperture 12 and the other side of aperture 14 and cancel on opposite sides of the apertures, causing an irreversible flux change in the portion of the core 10 coupled by the bit row conductor. The coincident applied fields also have a magnitude sufficient to overcome the longitudinal bias field. Referring now back to FIG. 2, a new pulse program for the conductor B is shown labelled B′–18 indicating the output signals induced with the longitudinal bias field applied. As may be seen, there is now no output signal induced except in the case when both W and B conductors were coincidently energized. This signal is, however, of reduced magnitude than previously provided, the reduction being the predetermined magnitude of the induced word disturb signal.

In order to aid in understanding and practicing the invention and provide a starting place for one skilled in the art in the fabrication of this invention, a set of specifications for one embodiment of this invention is given below. It should be understood, however, that no limitation should be construed since other component values may be employed with satisfactory operations.

The core 10 may have length of 1.0 inch, inside diameter of 0.010 inch and an outside diameter of 0.020 inch. The material employed for fabricating the cores 10 may be of the type T–55 disclosed in U.S. Patent 2,950,252, assigned to the same assignee. The secondary apertures may have a diameter of approximately 0.003 inch and be separated by 0.050 inch of magnetic material along the length of the core 10. The field, in ampere turns (AT), provided to each core 10 by energized conductor W during the read out portion of the memory cycle may be 0.3 AT for one microsecond. The field provided by energized conductor W during the write portion of the memory cycle may be 0.1 AT for one microsecond while the field provided by an energized bit conductor B at this time may be 0.03 AT for four microseconds. The longitudinal bias field applied by magnet 28, having poles N and S of FIG. 3 or coils 30 and 32 of FIG. 4 or the high coercive force material 34 of FIG. 5 may be 1.0 oersteds. Without application of the bias field the signal-to-noise ratio was found to be 1.7:1 while with the bias field this ratio is found to be 7:1 or better.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory comprising:

a plurality of column conductors;

a like plurality of tubular magnetic cores surrounding a respective one of said column conductors made of magnetic material exhibiting different stable states of flux remanence each having a plurality of discrete portions dispersed along its length, with each portion having a pair of oppositely disposed secondary apertures whose central axes are transverse with respect to the longitudinal axis of the core;

utilization means;

row selection and drive means;

a plurality of row conductors each threaded through a different pair of the secondary apertures of each said core;

switching means for selectively connecting said row conductors to said utilization means during a first time interval and to said row selection and drive means during a second time interval in the operation of said memory;

means for applying a bias magnetic field directed along the longitudinal axis of each said core;

column selection and drive means operative during the first time interval for energizing a selected one of said column conductors to establish the core associated therewith in a datum remanent flux orientation stable state, and operative during the second time interval to energize said selected column conductor and apply a magnetic field to the core associated therewith tending to reverse the datum flux orientation state but being of insufficient magnitude, of and by itself, to cause an irreversible flux change in said core adjacent said secondary apertures; and said row selection and drive means operative during the second time interval for energizing at least one of said row conductors to apply a magnetic field to said core about the secondary apertures threaded which is of insufficient magnitude, of and by itself, to cause an irreversible change in the datum remanent flux orientation of said core but is conjointly operative with the field applied by the energized column conductor to irreversibly switch the material of said core adjacent said secondary apertures from said datum stable state to a different stable state of remanent flux orientation.

2. In a circuit:

a first conductor;

a tubular core surrounding said first conductor, made of magnetic material exhibiting a substantially rectangular hysteresis characteristic, with a plurality of portions dispersed along its length having a pair of oppositely disposed secondary apertures whose central axes are transverse with respect to the longitudinal axis of said core;

a plurality of second input conductors each threaded through a respective pair of said secondary apertures;

utilization means;

secondary selection and drive means;

switching means for selectively connecting said second input conductors to said utilization means during a first time interval and to said secondary selection and drive means during a second time interval in the operation of said circuit;

biasing means for applying a magnetic field along the longitudinal axis of said core;

means operative during the first time interval for energizing said first conductor to establish said core in a circumferential datum remanent flux orientation stable state and operative during said second time interval for energizing said first conductor to apply a circumferential magnetic field to said core tending to reverse the datum flux orientation state, but being of insufficient magnitude, of and by itself, to cause an irreversible flux change in the material of said core adjacent said secondary apertures; and said secondary selection and drive means operative during the second time interval for energizing at least one of said second input conductors to apply a magnetic field to said core about the secondary apertures threaded which is of insufficient magnitude, of and by itself, to cause an irreversible change in the datum remanent flux orientation of said core but conjointly operative with the field applied by said energized first conductor to irreversibly switch the material of said core adjacent said secondary apertures from said datum stable state to a different stable state of remanent flux orientation.

3. A storage device comprising:

a first input conductor;

a tubular core surrounding said first conductor, made of magnetic material exhibiting a substantially rectangular hysteresis characteristic, being normally magnetized in a datum stable state of remanent flux orientation and having dispersed along its length at least one pair of oppositely disposed secondary apertures whose central axes are transverse with respect to the longitudinal axis of said core;

a second input conductor threaded through said pair of secondary apertures, biasing means for applying a magnetic field to said core directed along its longitudinal axis;

means for energizing said first conductor to apply a magnetic field to said core in opposition to the datum remanent flux orientation thereof, but being of insufficient magnitude, of and by itself, to cause an irreversible flux change in the material of said core adjacent said secondary apertures; and further means for coincidently energizing said second conductor to apply a magnetic field to said core about the secondary apertures which is of insufficient magnitude, of and by itself, to cause an irreversible flux change but conjointly operative with the field applied by the energized first conductor to irreversibly switch the material of said core adjacent said secondary apertures from said datum stable state to a different stable state of remanent flux orientation.

4. A storage device comprising:

a first input conductor;

a tubular core surrounding said first conductor, made of magnetic material exhibiting a plurality of stable states of remanent flux orientation, being normally magnetized in a datum stable state of remanent flux orientation and having dispersed, along its length, at least one pair of secondary apertures whose central axes are transverse with respect to the longitudinal axis of said core;

a second input conductor threaded through said pair of secondary apertures;

means for applying a magnetic bias field to said core along the longitudinal axis thereof;

and means for coincidently energizing said first and second input conductors to irreversibly switch the magnetization of said core adjacent said secondary apertures only, from said datum stable state to a further stable state of remanent flux orientation.

5. The storage device of claim 4, wherein the central axes of said secondary apertures coincide.

6. A storage device comprising:

a main apertured tubular core made of magnetic material exhibiting a plurality of stable states of remanent flux orientation and being normally magnetized circumferentially in a datum stable state of remanent flux orientation, means for applying a magnetic bias field along the length of said core;

further means for passing a first current through the main aperture of said core to apply a magnetic field in opposition to the datum circumferential stable state of remanent flux orientation;

and other means for coincidently passing a second current through only a portion of said core directed transverse with respect to said first current to apply a magnetic field to irreversibly switch only said portion of said core by conjoint application of said applied fields to a different remanent stable state.

7. The device of claim 4, wherein said means for applying the bias field comprises a layer of high coercive force magnetic material deposited on the periphery of said core.

8. The device of claim 4, wherein said means for applying the bias field comprises a pair of coils positioned at either ends of said cores.

No references cited.